US011565944B2

(12) United States Patent
Li et al.

(10) Patent No.: US 11,565,944 B2
(45) Date of Patent: *Jan. 31, 2023

(54) PROCESS FOR PREPARING TITANIC ACID SALT, TITANIC ACID, AND TITANIUM OXIDE HAVING CONTROLLABLE PARTICLE SIZE AND HIERARCHICAL STRUCTURE

(71) Applicant: PETROCHINA COMPANY LIMITED, Beijing (CN)

(72) Inventors: Jianming Li, Beijing (CN); Xu Jin, Beijing (CN); He Liu, Beijing (CN); Xiaodan Liu, Beijing (CN); Xiaoqi Wang, Beijing (CN); Liang Sun, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 484 days.

This patent is subject to a terminal disclaimer.

(21) Appl. No.: 16/556,211

(22) Filed: Aug. 29, 2019

(65) Prior Publication Data

US 2020/0071185 A1    Mar. 5, 2020

(30) Foreign Application Priority Data

Aug. 30, 2018   (CN) .......................... 201811001862.0

(51) Int. Cl.
*C01G 23/053* (2006.01)
*B01J 21/06* (2006.01)
(Continued)

(52) U.S. Cl.
CPC .......... *C01G 23/053* (2013.01); *B01J 21/063* (2013.01); *B01J 35/004* (2013.01); *C01G 23/005* (2013.01);
(Continued)

(58) Field of Classification Search
CPC .. C01G 23/053; C01G 23/005; C01G 23/003; C01G 23/047; C01G 23/00; B01J 21/063;
(Continued)

(56) References Cited

U.S. PATENT DOCUMENTS

| 4,755,373 A | 7/1988 | Gherardi et al. |
| 8,440,162 B1 | 5/2013 | Wong et al. |

(Continued)

FOREIGN PATENT DOCUMENTS

| CN | 102531050 A | 7/2012 |
| CN | 103570063 A | 2/2014 |

(Continued)

OTHER PUBLICATIONS

Chinese Search Report, 9 pages (dated Jul. 6, 2018).

(Continued)

*Primary Examiner* — Anthony J Zimmer
(74) *Attorney, Agent, or Firm* — Foley & Lardner LLP (57) ABSTRACT

A process for preparing a titanic acid salt, titanic acid, and titanium oxide having a controllable particle size and a hierarchical structure, wherein the process includes the steps of: preparing a titanium-containing peroxo-complex solution; adding a basic metal compound to the titanium-containing peroxo-complex solution to form a mixture solution; adding one of polyvinyl alcohol, hydroxypropyl methyl cellulose, and polyethylene glycol to the mixture solution to form a precursor dispersion; and subjecting the precursor dispersion to a solvothermal reaction to obtain the titanic acid salt having a hierarchical structure. The process for preparing a titanic acid salt, titanic acid, and titanium oxide having a controllable particle size and a hierarchical structure, can not only realize the regulation of morphology and (Continued)

particle diameter of constituent units in the hierarchical structure, but also can achieve the regulation of particle size in the hierarchical structure.

4 Claims, 6 Drawing Sheets

(51) Int. Cl.
 B01J 35/00 (2006.01)
 C01G 23/00 (2006.01)
 H01M 4/485 (2010.01)
 B82Y 40/00 (2011.01)

(52) U.S. Cl.
 CPC ............ *H01M 4/485* (2013.01); *B82Y 40/00* (2013.01); *C01P 2004/03* (2013.01); *C01P 2004/32* (2013.01); *C01P 2006/40* (2013.01)

(58) Field of Classification Search
 CPC ........ B01J 35/004; B01J 23/002; B01J 23/04; H01M 4/485; H01M 10/0525; H01M 10/054; B82Y 40/00; C01P 2004/03; C01P 2004/32; C01P 2006/40; Y02E 10/542; Y02E 10/549; Y02E 60/10; H01G 9/2031; H01L 51/42
 See application file for complete search history.

(56) References Cited

U.S. PATENT DOCUMENTS

| | | | |
|---|---|---|---|
| 2013/0102458 A1 | 4/2013 | Wong et al. | |
| 2014/0002804 A1 | 1/2014 | Tsai et al. | |
| 2014/0072804 A1 | 3/2014 | Hobbs et al. | |
| 2020/0083528 A1* | 3/2020 | Li | ................ C01G 23/005 |

FOREIGN PATENT DOCUMENTS

| | | | | | |
|---|---|---|---|---|---|
| CN | 104064735 A | | 9/2014 | | |
| CN | 104201364 A | | 12/2014 | | |
| CN | 104261465 A | | 1/2015 | | |
| CN | 104821397 A | | 8/2015 | | |
| CN | 104261465 B | | 7/2016 | | |
| CN | 107256961 A | | 10/2017 | | |
| CN | 108275718 A | | 7/2018 | | |
| CN | 108946798 A | | 12/2018 | | |
| CN | 109888272 A | * | 6/2019 | | |
| CN | 108946798 B | * | 4/2021 | ............ | B82Y 30/00 |
| JP | 05-330824 | | 12/1993 | | |
| JP | 2015-067519 | | 4/2015 | | |
| KR | 20140092483 A | | 7/2014 | | |

OTHER PUBLICATIONS

Japan First Office Action and English Translation issued for corresponding Japanese Patent Application 2019-154669 dated Aug. 4, 2020. 10 Pages.
Extended European Search Report, App. No. 19194478.4, Petrochina Company Limited (dated Nov. 29, 2019).
Wu et al., "Alkaline hydrothermal synthesis of homogeneous titania microspheres with urchin-like nanoarchitectures for dye effluent treatments," Journal of Hazardous Materials, vol. 194, pp. 338-344 (Jul. 28, 2011).
Zhou et al., "Three-dimensional sea-urchin-like hierarchical TiO2 microspheres synthesized by a one-pot hydrothermal method and their enhanced photocatalytic activity," Materials Res. Bulletin, vol. 48, No. 7, pp. 2420-2425 (Mar. 5, 2013).
English translation of Chinese Office Action and Search Report, App. No. 201811001862.0, Petrochina Company Limited (dated May 9, 2020).

* cited by examiner

PROCESS FOR PREPARING TITANIC ACID SALT, TITANIC ACID, AND TITANIUM OXIDE HAVING CONTROLLABLE PARTICLE SIZE AND HIERARCHICAL STRUCTURE

CROSS-REFERENCE TO RELATED APPLICATIONS

This application claims the benefit of and priority to Chinese Patent Application No. 201811001862.0, filed Aug. 30, 2018, which is incorporated herein by reference in its entirety.

TECHNICAL FIELD

The present invention relates to a process for preparing a titanic acid salt, titanic acid, and titanium oxide having a controllable particle size and a hierarchical structure, and belongs to the technical field of energy and environmental protection materials.

BACKGROUND

Titanic acid salt, titanic acid, and titanium oxide have been widely used in the technical fields of lithium ion batteries, potassium ion batteries, sodium ion batteries, catalysis, photocatalysis, solar cells, water photolysis, sensing, biology and the like, and is a hotspot for the research in the material field.

Various application performances of titanic acid salts, titanic acid and titanium oxide materials are closely related to their morphology and structure. The one-dimensional structure mainly includes nanowires, nanorods, nanotubes and nanoribbons. Among them, the nanotubes have two surfaces, inner surface and outer surface, so that they have a high specific surface area, and have good advantages in the research and application of one-dimensional material structure, and have received much attention. As compared with single crystal nanoparticles, one-dimensional linear nanomaterials can reduce the grain boundary between particles and facilitate the transport of carriers in the longitudinal direction. They have the following characteristics: (1) at the nanometer scale, the specific surface area and active sites increase dramatically material, which can greatly accelerate the reaction on the surface and the interaction with the media; (2) in the photocatalysis field, the free movement of photogenerated electron-hole pair in the longitudinal direction will be facilitated, the recombination probability of electrons and holes will be reduced and the photocatalytic efficiency will be improved; (3) in the field of battery electrode materials, the long axis is beneficial for the effective migration of electrons, and the short axis is beneficial for the rapid intercalation and deintercalation process of lithium, sodium or potassium ions; in addition, the one-dimensional nanostructures have better charge-discharge performance, as compared with the nanoparticles; (4) in the field of solar cells, the one-dimensional structure can greatly reduce the grain boundaries between particles, facilitate the transport of electrons in the photoanode, and greatly improve the efficiency for collecting and converting electrons in the battery and the like.

In recent years, since the hierarchical structure has a high degree of order, and can achieve a variety of functions, its design and development has received many attentions. The hierarchical structure can increase the specific surface area of the material, increase the order of contact of the nanoparticles, and enhance the effective migration of electrons. However, the currently reported hierarchical structure for titanic acid salt, titanic acid salt and titanium oxide cannot achieve the effective regulation of particle size of nanowires and nanotubes in the hierarchical structure, or the regulation of particle size of the hierarchical structure material. Thus, it is one of the problems to be solved urgently in the art to find and realize the effective regulation of structure and morphology of the constituents in the hierarchical structure of titanic acid salt, titanic acid salt and titanium oxide and the particle size of spherical particles in the hierarchical structure, and design the desired material which may be used to construct multifunctional nanoscale device through reasonable experimentation and regulation.

SUMMARY

To solve the above technical problems, an object of the present disclosure is to provide processes for preparing titanic acid salts, titanic acid, and titanium oxide having a controllable particle size and a hierarchical structure, which can synthesize titanic acid salts, titanic acid, and titanium oxide product having a hierarchical structure with controllable particle size and constituent morphology and structure, and find the morphology and structure of the material with the best performance, by adding a polymer in the reaction system and adjusting the amount of the polymer.

In order to achieve the above object, the present disclosure firstly provides a process for preparing a titanic acid salt having a controllable particle size and a hierarchical structure, wherein the process comprises the steps of:

S1, preparing a titanium-containing peroxo-complex solution;

S2, adding a basic metal compound to the titanium-containing peroxo-complex solution to form a mixture solution;

S3, adding a polymer to the mixture solution to form a precursor dispersion; the polymer includes one of polyvinyl alcohol, hydroxypropyl methyl cellulose, and polyethylene glycol; and S4, subjecting the precursor dispersion to a solvothermal reaction to obtain the titanic acid salt having a hierarchical structure.

In the process for preparing the titanic acid salt having a hierarchical structure, preferably the prepared titanic acid salt mainly includes but is not limited to, one or more of lithium titanate, sodium titanate, potassium titanate, and the like.

In the process for preparing the titanic acid salt having a hierarchical structure, preferably, the hierarchical structure mainly includes, but is not limited to, one or more of a spherical hierarchical structure composed of nanoplatelet particles, a spherical hierarchical structure composed of nanotube particles, a spherical hierarchical structure composed of nanowire particles, and the like.

In the process for preparing the titanic acid salt having a hierarchical structure, preferably, in S1, the process for preparing the titanium-containing peroxo-complex solution is carried out by dispersing a titanium source in an aqueous hydrogen peroxide solution to form a solution; preferably, the molar concentration ratio of the titanium source to the hydrogen peroxide is 1:3 to 1:6; preferably, the titanium source used is one or more selected from the group consisting of titanium metal, titanium ethoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, titanium nitride, titanium oxide, metatitanic acid, orthotitanic acid and the like. The dispersing is carried out by one or more selected from dispersion under agitation, ultrasonic dispersion and the like. The dispersing is preferably carried out at a temperature of from 10 degrees Celsius to 100 degrees Celsius. The aqueous hydrogen peroxide solution may be one selected from the group consisting of an acidic aqueous hydrogen peroxide solution, a neutral aqueous hydrogen peroxide solution, and an alkaline aqueous hydrogen peroxide solution; wherein the acidic aqueous hydrogen peroxide solution is adjusted to be acidic with one or more of sulfuric acid, hydrochloric acid, nitric acid and acetic acid; the alkaline aqueous hydrogen peroxide solution is adjusted to be alkaline with one or more of aqueous ammonia, sodium hydroxide, lithium hydroxide, potassium hydroxide, and organic amine.

When the titanium source is dispersed in an aqueous hydrogen peroxide solution to form a solution for preparing the titanium-containing peroxo-complex solution, the titanium source may be hydrated titanic acid (containing only Ti, O, and H, without metal ions or other organic compounds, no impurities); and the hydrated titanic acid may be obtained from a titanium-containing compound by a hydrolysis reaction. The titanium-containing compound may be one or more selected from the group consisting of titanium ethoxide, titanium propoxide, tetrabutyl titanate, titanium glycolate, titanium glyceroxide, titanium sulfate, titanium oxysulfate, titanium tetrachloride, titanium tetrafluoride, ammonium fluorotitanate, industrial titanium-containing compounds and the like. The hydrolysis reaction is carried out by dispersing the titanium-containing compound in pure water for direct hydrolysis to form the hydrated titanic acid, or the hydrolysis reaction is carried out by dispersing the titanium-containing compound in an aqueous solution containing a basic substance for hydrolysis to form the hydrated titanic acid. The basic substance is one or more selected from the group consisting of aqueous ammonia, sodium hydroxide, potassium hydroxide, tetramethylammonium hydroxide, tetraethyl ammonium hydroxide, tetrapropylammonium hydroxide, tetrabutylammonium hydroxide, ethylenediamine, diethylamine, triethylamine, ethylamine, ethanolamine, diethanolamine and the like. The above process for dispersing the titanium source in an aqueous hydrogen peroxide solution to form a solution for preparing the titanium-containing peroxo-complex solution, is to subject the titanium-containing compound to the hydrolysis reaction and then purify to obtain the hydrated titanic acid; the purification is used to remove impurity ions to obtain the hydrated titanic acid having a purity of 97% or more; the purification may be carried out by one or more of water washing—separation by centrifugation, water washing—membrane separation, water washing—filtration and dialysis.

In the process for preparing the titanic acid salt having a hierarchical structure, preferably in S2, the concentration of the basic metal compound in the mixture solution is 0.05 mol/L to 0.4 mol/L; more preferably, the concentration is 0.10 mol/L to 0.35 mol/L. Preferably, the molar ratio of the titanium source to the basic metal compound is 1:100 to 1:1.

In the process for preparing the titanic acid salt having a hierarchical structure, preferably in S2, the basic metal compound used is one or more selected from the group consisting of a basic metal oxide, a basic metal peroxide, a basic metal superoxide, a basic metal hydroxide and the like. The metal element in the basic metal compound may be one or more selected from lithium, sodium, and potassium.

In the process for preparing the titanic acid salt having a hierarchical structure, preferably in S2, the basic metal compound is added in the form of a solid or an aqueous solution. Meanwhile, during the addition, the rate of addition of the metal compound is controlled so that it is added slowly.

In the process for preparing the titanic acid salt having a hierarchical structure, in S3, the addition of the polymer (one of polyvinyl alcohol, hydroxypropyl methyl cellulose, and polyethylene glycol) can regulate the morphology and particle size of the titanic acid salt product having a hierarchical structure. The mechanism after addition is that the substance such as polyvinyl alcohol, hydroxypropyl methyl cellulose, or polyethylene glycol has an advantages of being relatively stable under a high temperature and a basic condition, can make the titanium peroxo-complex more stable, and control the nucleation and growth rate of the titanic acid salt during the solvothermal reaction under a strong alkaline condition, while the substance such as polyvinyl alcohol, hydroxypropyl methyl cellulose, or polyethylene glycol can also increase the viscosity of the precursor dispersion, reduce the diffusion rate of ions, and in turn control the particle size. In addition, polyvinyl alcohol, hydroxypropyl methylcellulose, polyethylene glycol, and the like also have application advantages such as abundant sources and low prices.

In the process for preparing the titanic acid salt having a hierarchical structure, preferably in S3, the content by mass of the polymer (one of polyvinyl alcohol, hydroxypropyl methyl cellulose, and polyethylene glycol) in the precursor dispersion is 0.01% to 10%; preferably the content is from 0.1% to 1%.

In the process for preparing the titanic acid salt having a hierarchical structure, preferably in S3, the polymer (one of polyvinyl alcohol, hydroxypropyl methyl cellulose, and polyethylene glycol) is added in the form of a solid or an aqueous solution.

In the process for preparing the titanic acid salt having a hierarchical structure, preferably, the precursor dispersion may be one of a solution (transparent solution), an emulsion, a suspension, and the like.

In the process for preparing the titanic acid salt having a hierarchical structure, preferably in S4, the solvothermal reaction is carried out at a temperature of 80 degrees Celsius to 200 degrees Celsius; the solvothermal reaction is carried out for 1 to 24 hours.

The process for preparing the titanic acid salt having a hierarchical structure provided can not only realize the regulation of morphology and particle diameter of constituent units in the hierarchical structure, but also can achieve the regulation of particle size in the hierarchical structure, which cannot be achieved by other processes.

The present disclosure also provides a titanic acid salt having a hierarchical structure prepared by the above preparation process.

The present disclosure also provides a process for surface modifying the titanic acid salt having a hierarchical structure, which can increase the conductivity of the titanic acid salt through surface modification. Preferably, the surface modification includes one or more of supporting carbon, supporting carbon nanotubes, supporting graphene, supporting black phosphorus, supporting a metal and the like.

The present disclosure also provides use of the titanic acid salt having a hierarchical structure as an electrode material in an ion battery; preferably, the ion battery is one or more selected from a lithium ion battery, a sodium ion battery, a potassium ion battery, and a magnesium ion battery.

The present disclosure also provides a process for preparing titanic acid, wherein the process comprises the step of:

subjecting the titanic acid salt having a hierarchical structure prepared according to the present invention to an acid exchange process to obtain the titanic acid having a hierarchical structure. Preferably, the acid exchange process comprises: drying, washing and separating the titanic acid salt having a hierarchical structure; and placing the separated titanic acid salt having a hierarchical structure in an acid solution for hydrogen ion exchange to obtain the titanic acid having a hierarchical structure. The acid solution used may be one or more selected from nitric acid, hydrochloric acid, sulfuric acid, acetic acid and the like, and the concentration of the acid solution is 0.001 mol/L to 0.1 mol/L.

According to a particular embodiment, the process for preparing titanic acid may comprise the steps of: separating and drying the titanic acid salt having a hierarchical structure; and subjecting the dried titanic acid salt having a hierarchical structure to washing and separation for several times; placing the washed and separated titanic acid salt having a hierarchical structure in an acid solution for hydrogen ion exchange to obtain the titanic acid product having a hierarchical structure; and washing, separating and drying the obtained titanic acid product having a hierarchical structure to obtain the titanic acid having a hierarchical structure.

The present disclosure also provides the titanic acid having a hierarchical structure prepared by the above preparation process.

The present disclosure also provides use of the titanic acid having a hierarchical structure as an electrode material or a contaminant adsorbent in an ion battery; preferably, the ion battery is one or more selected from a lithium ion battery, a sodium ion battery, a potassium ion battery, a magnesium ion battery, and the like.

The present disclosure also provides a process for preparing titanium oxide, comprising the steps of:

subjecting the titanic acid having a hierarchical structure to hydrothermal reaction and/or annealing to obtain the titanium oxide having a hierarchical structure. The system for the hydrothermal reaction is one selected from a pure water system, an acidic water system, and an alkaline water system. The hydrothermal reaction may be carried out at a temperature of 100 degrees Celsius to 200 degrees Celsius; and the hydrothermal reaction may be carried out for 1 to 24 hours; the annealing may be carried out at a temperature of 300 degrees Celsius to 700 degrees Celsius; and the annealing may be carried out for 1 to 24 hours.

The present disclosure also provides the titanium oxide having a hierarchical structure prepared by the above preparation process.

The disclosure also provides use of the titanium oxide having a hierarchical structure in one or more of catalytic hydrogenation of a material, photocatalytic degradation of organic contaminants, hydrogen production by photocatalytic decomposition of water, gas sensing, dye-sensitized solar cell, perovskite solar cell, hydrophilic or hydrophobic material, biomedical field and the like.

Figure 1:
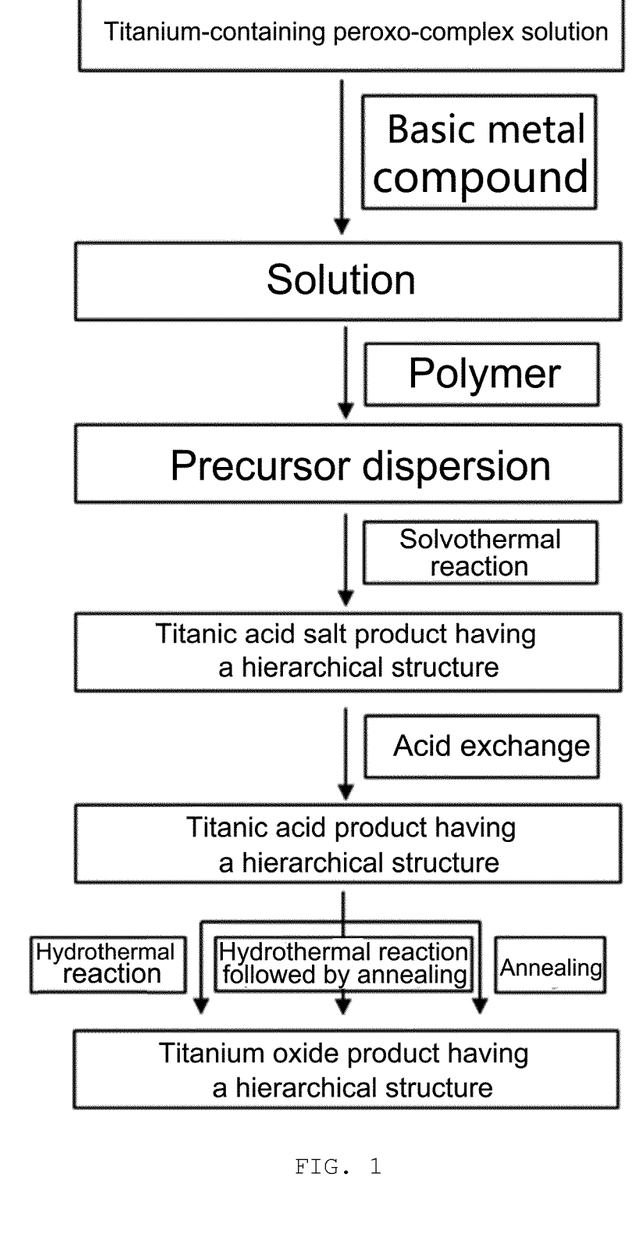
FIG. 1 is a schematic flow diagram of the preparation process of the titanic acid salt, titanic acid, and titanium oxide having a controllable particle size and a hierarchical structure.

The process for preparing the titanic acid salt, titanic acid and titanium oxide having the hierarchical structure may be as shown in FIG. 1. The prepared titanic acid salt, titanic acid and titanium oxide are microbeads of a hierarchical structure composed of one-dimensional nanotubes or nanowires, and are beneficial for improving the application effects of the material in the fields of battery electrodes, catalysis, photocatalysis, sensing, solar cells, hydrophilicity or hydrophobicity, biology, and the like.

The advantages of the present disclosure are:

(1) The process for preparing a titanic acid salt, titanic acid, and titanium oxide having a controllable particle size and a hierarchical structure can not only realize the regulation of morphology and particle diameter of constituent units in the hierarchical structure, but also can achieve the regulation of particle size in the hierarchical structure, which cannot be achieved by other processes.

(2) The process can produce titanic acid salt microbeads having a hierarchical structure with a particle size less than 100 nanometers, which cannot be achieved by other processes.

(3) The product obtained by the process has controllable structure and particle size, and it can produce functional materials or devices applicable in the fields of a storage battery, photocatalysis, a solar cell, sensing, biomedical, contaminant adsorption and processing, or the like, by designing the morphology and structure of the material.

(4) The process has a simple process, and easily controllable process parameters, and is easy to scale to the industrial production.

(5) The process uses a readily available raw material, and has a low production cost.

DETAILED DESCRIPTION

In order to enable those skilled in the art to better understand the technical solution of the present disclosure, the technical solutions in the Examples will be set forth clearly and completely with reference to the Examples. It is obvious that the described Examples are merely part of the Examples of the present disclosure, rather than all Examples. Any other examples achieved by a person of ordinary skill in the art based on the examples of the present disclosure without inventive work shall fall within the scope of the present disclosure.

Unless defined otherwise, all technical and scientific terms used herein have the same meanings as commonly understood by one of ordinary skill in the art to which the present disclosure belongs. Herein, the terms are used in the Description of the present disclosure for the purpose of describing particular embodiments, and are not intended to limit the present invention. The term "and/or" as used herein includes any and all combinations of one or more of the listed items.

Specific embodiments are disclosed herein in detail and the modes, in which the principle of the present application can be applied, are set forth, by reference to the following description. It should be understood that the embodiments of the invention are not limited in scope. The embodiments include many variations, modifications, and equivalents within the scope of spirit and paragraphs of the appended claims.

Features described and/or illustrated with respect to one embodiment may be used in one or more other embodiments in the same or similar manner, in combination with, or in place of, features in other embodiments.

It should be emphasized that the term "comprise/comprising", when used herein, refers to the presence of features, integers, steps or components, but does not preclude the presence or addition of one or more other features, integers, steps or components.

Any numerical value recited herein includes all values of the lower and upper values in increments of one unit from the lower limit to the upper limit, provided that there is an interval of at least two units between any lower value and any higher value. For example, if the value of the number of components or a process variable (e.g., temperature, pressure, time, etc.) is stated to be from 1 to 90, preferably from 20 to 80, more preferably from 30 to 70, it is intended that the values such as 15 to 85, 22 to 68, 43 to 51, and 30 to 32 are also explicitly listed in the specification. For a value less than 1, it is appropriately considered that one unit is 0.0001, 0.001, 0.01, or 0.1. These are merely examples that are intended to be expressly stated, and all possible combinations of numerical values recited between the minimum and maximum values are considered to be explicitly described in this specification in a similar manner.

Unless indicated otherwise, all ranges include endpoints and all numbers between the endpoints. "About" or "approximately" as used with a range applies to both endpoints of the range. Thus, "about 20 to 30" is intended to cover "about 20 to about 30", including at least the indicated endpoints.

All articles and references disclosed, including patent applications and publications, are hereby incorporated herein by reference for all purposes. The term "essentially consisting of" describing a combination shall include the determined elements, ingredients, components or steps, and other elements, ingredients, components or steps that do not substantially affect the basic novel characteristics of the combination. The use of the term "comprising" or "comprises" to described the combination of elements, ingredients, components or steps herein also contemplates embodiments essentially consisting of these elements, ingredients, components or steps. By using the term "may" herein, it is intended to mean that any of the described attributes included by "may" is optional.

Multiple elements, ingredients, components or steps can be provided by a single element, ingredient, component or step to be integrated. Alternatively, a single component, component, component or step to be integrated may be divided into multiple separate components, ingredients, components or steps. The disclosed term "a" or "an" used to describe the element, ingredient, component or step does not exclude other elements, ingredients, components or steps.

The principles of the present disclosure are described in detail below with reference to a plurality of examples.

Example 1

Figure 2:
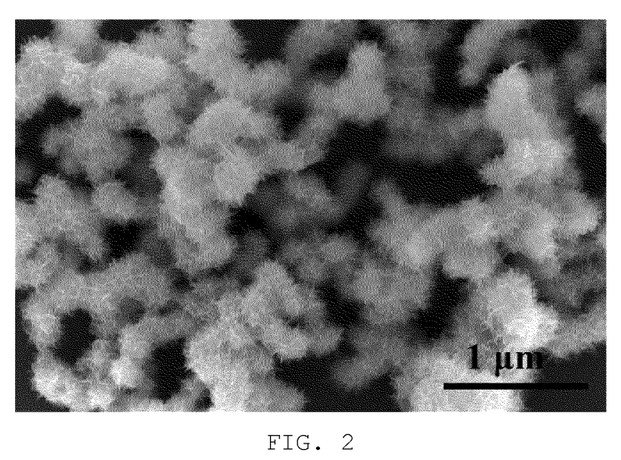
FIG. 2 is a SEM photograph of the morphology and structure of the sodium titanate microbead product having a hierarchical structure produced in Example 1.

This Example provides a process for preparing sodium titanate having a hierarchical structure, which comprises the following steps:

Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 180 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 10 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 150° C. for 12 hours, to obtain sodium titanate microbead product having a hierarchical structure (the structure thereof is shown in FIG. 2).

Example 2

Figure 3:
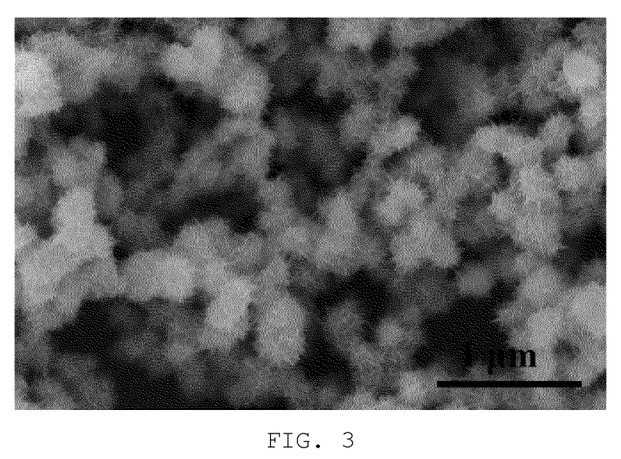
FIG. 3 is a SEM photograph of the morphology and structure of the sodium titanate microbead product having a hierarchical structure produced in Example 2.

This Example provides a process for preparing sodium titanate having a hierarchical structure, which comprises the following steps:

Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 170 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 20 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 150° C. for 12 hours, to obtain sodium titanate microbead product having a hierarchical structure (the structure thereof is shown in FIG. 3).

Example 3

Figure 4:
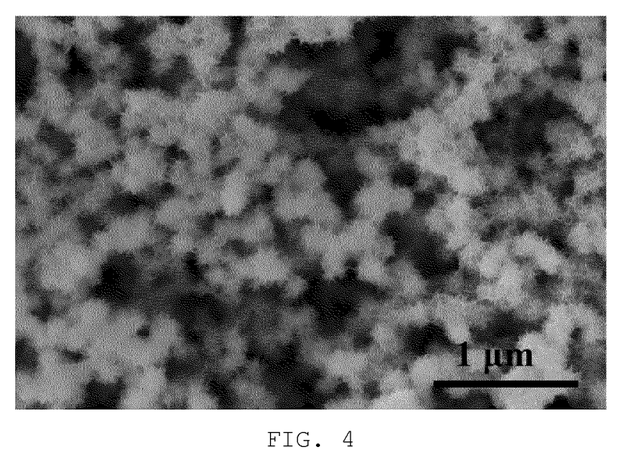
FIG. 4 is a SEM photograph of the morphology and structure of the sodium titanate microbead product having a hierarchical structure produced in Example 3.

This Example provides a process for preparing sodium titanate having a hierarchical structure, which comprises the following steps:
Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 40 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 150° C. for 12 hours, to obtain sodium titanate microbead product having a hierarchical structure (the structure thereof is shown in FIG. 4).

Example 4

Figure 5:
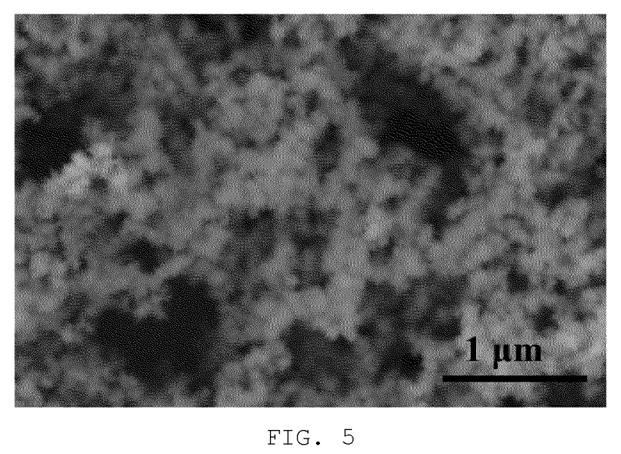
FIG. 5 is a SEM photograph of the morphology and structure of the sodium titanate microbead product having a hierarchical structure produced in Example 4.

This Example provides a process for preparing sodium titanate having a hierarchical structure, which comprises the following steps:
Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 40 ml of polyvinyl alcohol solution at a concentration of 10% was added to the above solution under stirring to form a precursor dispersion containing polyvinyl alcohol. Finally, the precursor dispersion containing polyvinyl alcohol was hydrothermally treated at 150° C. for 12 hours, to obtain sodium titanate microbead product having a hierarchical structure (the structure thereof is shown in FIG. 5).

Example 5

Figure 6:
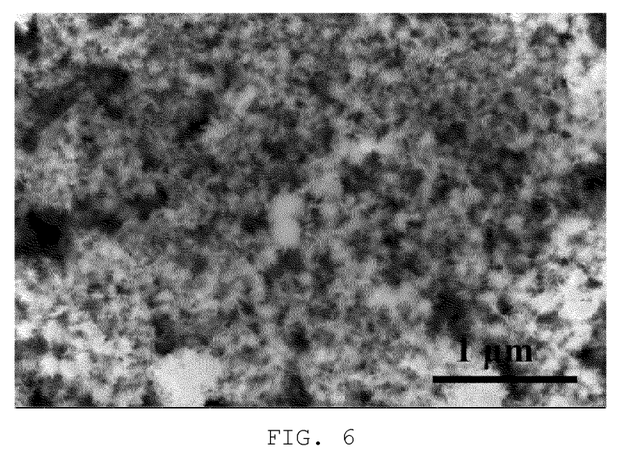
FIG. 6 is a SEM photograph of the morphology and structure of the sodium titanate microbead product having a hierarchical structure produced in Example 5.
Figure 7:
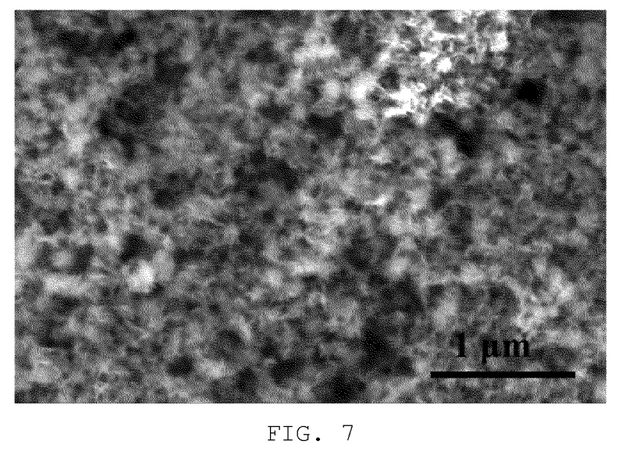
FIG. 7 is a SEM photograph of the morphology and structure of the sodium titanate microbead product having a hierarchical structure produced in Example 6.

This Example provides a process for preparing sodium titanate having a hierarchical structure, which comprises the following steps:
Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 40 ml of hydroxypropyl methyl cellulose solution at a concentration of 5% was added to the above solution under stirring to form a precursor dispersion containing hydroxypropyl methyl cellulose. Finally, the precursor dispersion containing hydroxypropyl methyl cellulose was hydrothermally treated at 150° C. for 12 hours, to obtain sodium titanate microbead product having a hierarchical structure (the structure thereof is shown in FIG. 6).

Example 6

This Example provides a process for preparing sodium titanate having a hierarchical structure, which comprises the following steps:
Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Then 40 ml of polyethylene glycol (PEG-8000) solution at a concentration of 5% was added to the above solution under stirring to form a precursor dispersion containing polyethylene glycol. Finally, the precursor dispersion containing polyethylene glycol was hydrothermally treated at 150° C. for 12 hours, to obtain sodium titanate microbead product having a hierarchical structure (the structure thereof is shown in FIG. 7).

Example 7

Figure 8:
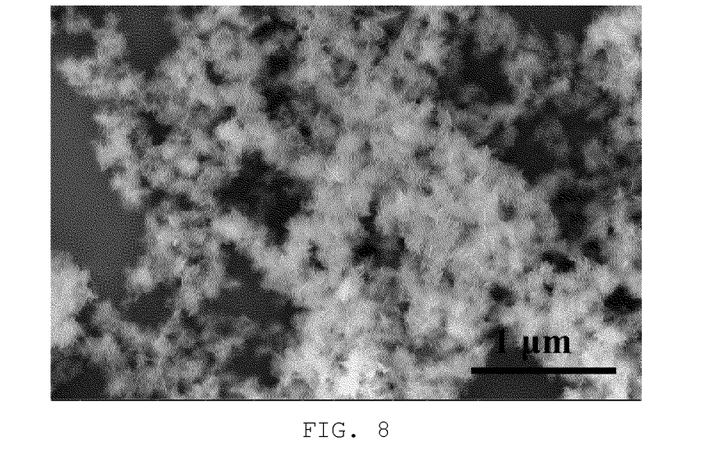
FIG. 8 is a SEM photograph of the morphology and structure of the lithium titanate microbead product having a hierarchical structure produced in Example 7.

This Example provides a process for preparing lithium titanate having a hierarchical structure, which comprises the following steps:
Under stirring, 1.5 g of titanium isopropoxide was dispersed and dissolved into 150 ml of water for direct hydrolysis to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.2 g of lithium hydroxide was added to the peroxo-complex solution under stirring to form a pale yellow transparent solution. Then 40 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 150° C. for 12 hours, to obtain lithium titanate microbead product having a hierarchical structure (the structure thereof is shown in FIG. 8).

Example 8

Figure 9:
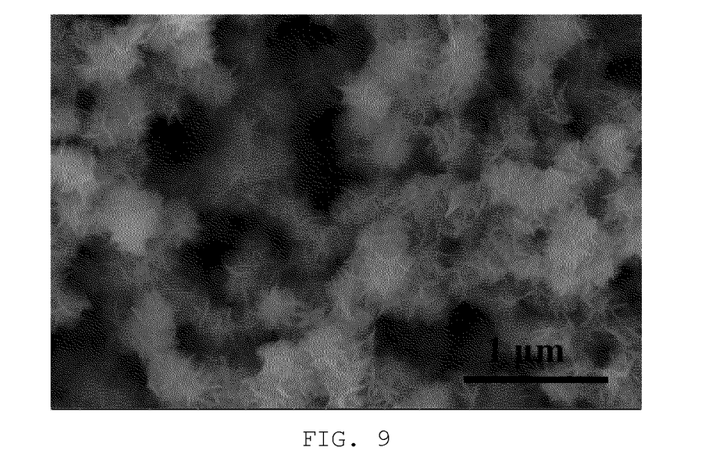
FIG. 9 is a SEM photograph of the morphology and structure of the lithium titanate microbead product having a hierarchical structure produced in Example 8.

This Example provides a process for preparing lithium titanate having a hierarchical structure, which comprises the following steps:
Under stirring, 1.5 g of tetrabutyl titanate was dispersed and dissolved into 150 ml of water for direct hydrolysis to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.6 g of lithium hydroxide was added to the peroxo-complex solution under stirring to form a pale yellow transparent solution. Then 40 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 150° C. for 12 hours, to obtain lithium titanate microbead product having a hierarchical structure (the structure thereof is shown in FIG. 9).

Example 9

Figure 10:
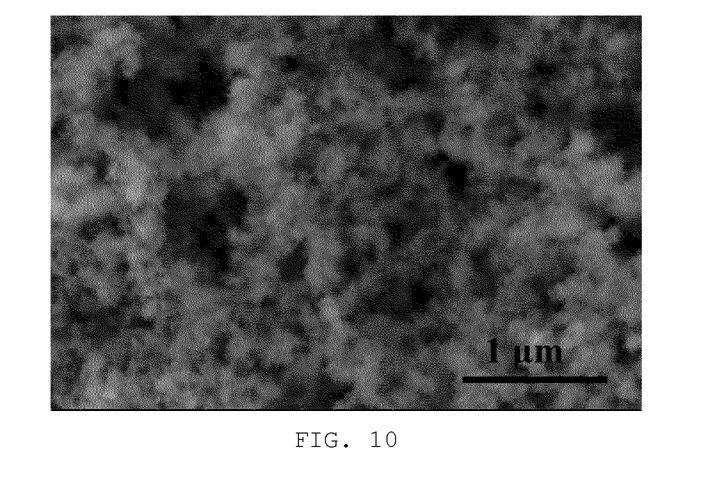
FIG. 10 is a SEM photograph of the morphology and structure of the potassium titanate microbead product having a hierarchical structure produced in Example 9.

This Example provides a process for preparing potassium titanate having a hierarchical structure, which comprises the following steps:
Under stirring, 3 g of titanium tetrachloride was dispersed and dissolved into 150 ml of water to form a solution, then potassium hydroxide at a concentration of 0.1 mol/L was slowly added dropwise to the solution until the solution was neutral, so that titanium tetrachloride was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.7 g of potassium hydroxide was added to the peroxo-complex solution under stirring to form a pale yellow transparent solution. Then 40 ml of polyvinyl alcohol solution at a concentration of 5% was added to the above solution under stirring to form a precursor dispersion containing polyvinyl alcohol. Finally, the precursor dispersion containing polyvinyl alcohol was hydrothermally treated at 160° C. for 12 hours, to obtain potassium titanate microbead product having a hierarchical structure (the structure thereof is shown in FIG. 10).

Example 10

This example provides a process for preparing titanic acid having a hierarchical structure, which comprises the following steps:
The sodium titanate microbead product having a hierarchical structure prepared in Example 1 was separated and dried in an oven. Subsequently, the dried sodium titanate microbead product having a hierarchical structure was washed several times with deionized water and separated, and then placed into a hydrochloric acid solution at 0.01 mol/L for hydrogen ion exchange. After hydrogen ion exchange, it was washed several times with deionized water until the pH of the washing liquid is close to neutral, and then separated and dried to obtain the titanic acid microbead product having a hierarchical structure.

Example 11

This example provides a process for preparing titanic acid having a hierarchical structure, which comprises the following steps:
The sodium titanate microbead product having a hierarchical structure prepared in Example 1 was separated and dried in an oven. Subsequently, the dried sodium titanate microbead product having a hierarchical structure was washed several times with deionized water and separated, and then placed into a hydrochloric acid solution at 0.10 mol/L for hydrogen ion exchange. After hydrogen ion exchange, it was washed several times with deionized water until the pH of the washing liquid is close to neutral, and then separated and dried to obtain the titanic acid microbead product having a hierarchical structure.

Example 12

This example provides a process for preparing titanic acid having a hierarchical structure, which comprises the following steps:
The titanic acid salt microbead product having a hierarchical structure prepared in any of Examples 2 to 9 was separated and dried in an oven. Subsequently, the dried titanic acid salt microbead product having a hierarchical structure was washed several times with deionized water and separated, and then placed into a hydrochloric acid solution at 0.05 mol/L for hydrogen ion exchange. After hydrogen ion exchange, it was washed several times with deionized water until the pH of the washing liquid is close to neutral, and then separated and dried to obtain the titanic acid microbead product having a hierarchical structure.

Example 13

This example provides a process for preparing titanium oxide having a hierarchical structure, which comprises the following steps:
The titanic acid microbead product having a hierarchical structure prepared in Example 10 was placed in a muffle furnace and annealed at 600° C. for 3 hours, to obtain the titanium oxide microbead product having a hierarchical structure.

Example 14

This example provides a process for preparing titanium oxide having a hierarchical structure, which comprises the following steps:
The titanic acid microbead product having a hierarchical structure prepared in Example 10 was dispersed into 50 ml of an aqueous nitric acid solution at 0.01 mol/L, and hydrothermally reacted at 120° C. for 6 hours, to obtain the titanium oxide microbead product having a hierarchical structure.

Example 15

This example provides a process for preparing titanium oxide having a hierarchical structure, which comprises the following steps:
The titanic acid microbead product having a hierarchical structure prepared in Example 10 was dispersed into 50 ml of an aqueous hydrochloric acid solution at 0.005 mol/L, and hydrothermally reacted at 120° C. for 2 hours. Then the hydrothermal reaction product was separated, dried, and placed in a muffle furnace, and annealed at 400° C. for 4 hours, to obtain the titanium oxide microbead product having a hierarchical structure.

Example 16

This example provides a process for preparing titanium oxide having a hierarchical structure, which comprises the following steps:
The titanic acid microbead product having a hierarchical structure prepared in any of Examples 11 to 12 was placed in a muffle furnace and annealed at 500° C. for 4 hours, to obtain the titanium oxide microbead product having a hierarchical structure.

Comparative Example 1

Figure 11:
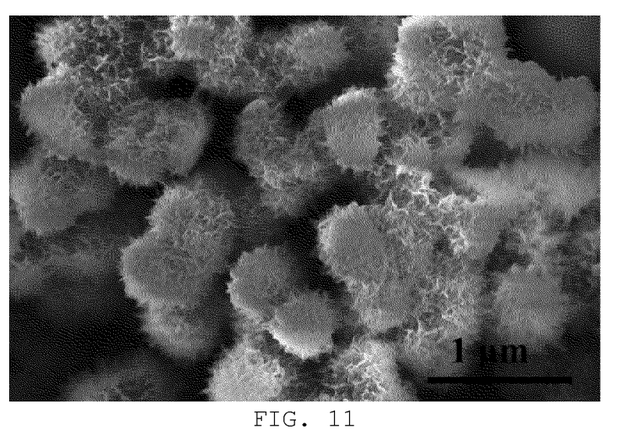
FIG. 11 is a SEM photograph of the morphology and structure of the sodium titanate microbead product having a hierarchical structure produced in Comparative Example 1.

This Example provides a process for preparing sodium titanate having a hierarchical structure, which comprises the following steps:
Under stirring, 2 g of titanium oxysulfate was dispersed and dissolved into 150 ml of water to form a solution, then aqueous ammonia at a concentration of 0.1 mol/L was slowly added dropwise to the solution until the solution was neutral, so that titanium oxysulfate was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 190 ml of water, and 10 ml of 30% aqueous hydrogen peroxide solution was added under stirring to form a titanium-containing peroxo-complex solution. Subsequently, 1.6 g of sodium hydroxide was added to the peroxo-complex solution under stirring to form a pale yellow transparent solution. Finally, the pale yellow transparent solution was hydrothermally treated at 150° C. for 12 hours, to obtain sodium titanate microbead product having a hierarchical structure (the structure thereof is shown in FIG. 11).

Comparative Example 2

Figure 12:
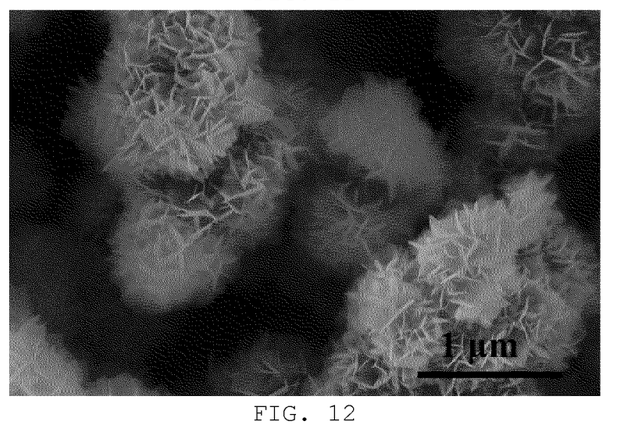
FIG. 12 is a SEM photograph of the morphology and structure of the lithium titanate microbead product having a hierarchical structure produced in Comparative Example 2.

This Example provides a process for preparing lithium titanate having a hierarchical structure, which comprises the following steps:
Under stirring, 1.5 g of titanium isopropoxide was dispersed and dissolved into 150 ml of water for direct hydrolysis to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.2 g of lithium hydroxide was added to the peroxo-complex solution under stirring to form a pale yellow transparent solution. Finally, the pale yellow transparent solution was hydrothermally treated at 150° C. for 12 hours, to obtain lithium titanate microbead product having a hierarchical structure (the structure thereof is shown in FIG. 12).

Comparative Example 3

Figure 13:
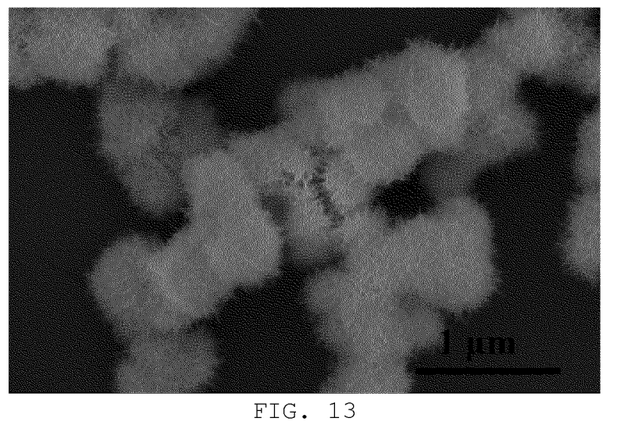
FIG. 13 is a SEM photograph of the morphology and structure of the potassium titanate microbead product having a hierarchical structure produced in Comparative Example 3.

This Example provides a process for preparing potassium titanate having a hierarchical structure, which comprises the following steps:
Under stirring, 3 g of titanium tetrachloride was dispersed and dissolved into 150 ml of water to form a solution, then potassium hydroxide at a concentration of 0.1 mol/L was slowly added dropwise to the solution until the solution was neutral, so that titanium tetrachloride was gradually and completely hydrolyzed to form a hydrated titanic acid precipitate. Subsequently, the hydrated titanic acid precipitate was ultrasonically dispersed, washed several times with deionized water, and separated by centrifugation. The separated hydrated titanic acid precipitate was ultrasonically dispersed in 150 ml of water, and 10 ml of 30% aqueous hydrogen peroxide solution was added under stirring to form a titanium-containing peroxo-complex solution. Subsequently, 1.7 g of potassium hydroxide was added to the peroxo-complex solution under stirring to form a pale yellow transparent solution. Finally, the pale yellow transparent solution was hydrothermally treated at 160° C. for 12 hours, to obtain potassium titanate microbead product having a hierarchical structure (the structure thereof is shown in FIG. 13).

The related data results of titanic acid salts in Examples 1-9 and Comparative Examples 1-3 are shown in Table 1 below.

TABLE 1

| No. | Titanic acid salt | Additives and concentrations | Constituent unit | particle size of Microbead | Dispersibility |
|---|---|---|---|---|---|
| Example 1 | Sodium titanate | 0.25% polyvinyl alcohol | wire | 250-350 nm | OK |
| Example 2 | Sodium titanate | 0.5% polyvinyl alcohol | tube and wire | 150-250 nm | good |
| Example 3 | Sodium titanate | 1.0% polyvinyl alcohol | tube | 100-150 nm | good |
| Example 4 | Sodium titanate | 2.0% polyvinyl alcohol | tube | 80-100 nm | good |
| Example 5 | Sodium titanate | 1.0% hydroxypropyl methylcellulose | tube | 40-60 nm | good |
| Example 6 | Sodium titanate | 1.0% polyethylene glycol | tube and platelet | 50-80 nm | OK |
| Example 7 | Lithium titanate | 1.0% polyvinyl alcohol | tube and platelet | 80-150 nm | OK |
| Example 8 | Lithium titanate | 1.0% polyvinyl alcohol | tube | 200-300 nm | OK |
| Example 9 | Potassium titanate | 1.0% polyvinyl alcohol | platelet | 60-80 nm | good |
| Comparative example 1 | Sodium titanate | none | tube and wire | 300-600 nm | agglomerated |
| Comparative example 2 | Lithium titanate | none | platelet | 300-700 nm | agglomerated |
| Comparative example 3 | Potassium titanate | none | wire | 200-450 nm | agglomerated |

It can be seen from the data of Table 1 that the results of constituent units, particle size of the microbead, and dispersability and the like in each of the products of the Examples are different, indicating that the process of the present disclosure can realize the control of the particle size of the titanic acid salts, and provide them with a hierarchical structure. Similarly, the process according to the present disclosure thus can realize the corresponding control of titanic acid and titanium oxide.

Figure 14:
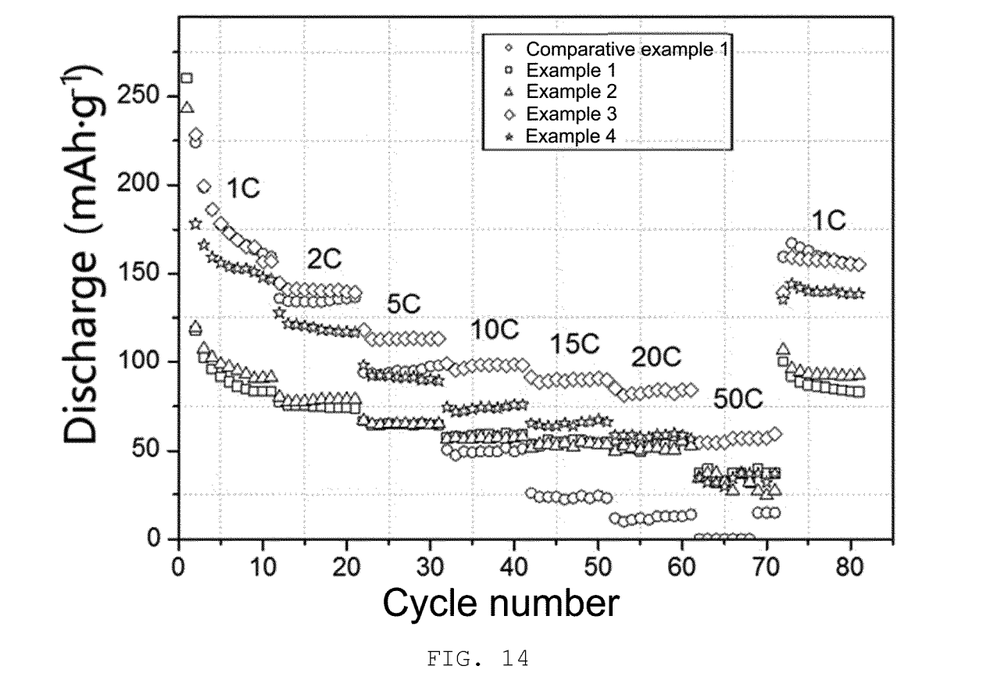
FIG. 14 is a chart of discharge capacity of the sodium ion battery containing the sodium titanate microbead product having a hierarchical structure and different particle sizes obtained in Examples 1 to 4 and Comparative Example 1, at different charge/discharge rates.
Figure 15:
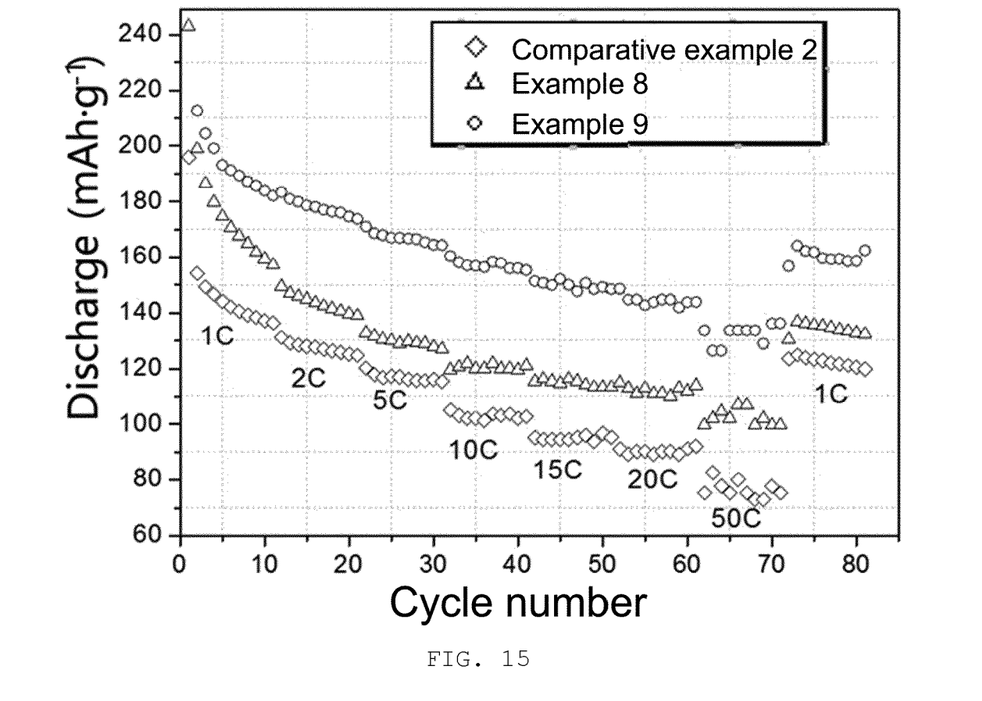
FIG. 15 is a chart of discharge capacity of the sodium ion battery containing the lithium titanate microbead product having a hierarchical structure and different particle sizes obtained in Examples 8 to 9 and Comparative Example 2, at different charge/discharge rates.

FIG. 14 is a chart of discharge capacity of the sodium ion battery containing the sodium titanate microbead product having a hierarchical structure and different particle sizes obtained in Examples 1 to 4 and Comparative Example 1, at different charge/discharge rates. The discharge capacity was tested in the following manner. The sodium ion battery electrode was prepared using knife coating process. Firstly, a slurry was prepared in a mass ratio of sodium titanate microbead having a hierarchical structure:Super P:polyvinylidene fluoride (PVDF)=7:2:1 with N-methylpyrrolidone (NMP) as solvent. Subsequently the slurry was uniformly coated on a copper foil using a knife coater, and then a model CR2032 button cell was assembled in a glove box with metallic lithium as a counter electrode, 1 mol/L $NaClO_4$ dissolved in EC/DMC (in volume ratio of 1:1) with a volume fraction of 2% of FEC additive as the electrolytic solution, and Glass Fiber as a separator and it was electrochemically tested. FIG. 15 is a chart of discharge capacity of the sodium ion battery containing the lithium titanate microbead product having a hierarchical structure and different particle sizes obtained in Examples 8 to 9 and Comparative Example 2, at different charge/discharge rates. The discharge capacity was tested in the following manner. The lithium ion battery electrode was prepared using knife coating process. Firstly, a slurry was prepared in a mass ratio of lithium titanate microbead product having a hierarchical structure:Super P:polyvinylidene fluoride (PVDF)=7:2:1 with N-methylpyrrolidone (NMP) as solvent. Subsequently the slurry was uniformly coated on a copper foil using a knife coater, and then a model CR2032 button cell was assembled in a glove box with metallic lithium as a counter electrode, 1 mol/L $LiPF_6$/EC-DMC-EMC (1:1:1) as the electrolytic solution, and Glass Fiber as a separator, and it was electrochemically tested. It can be seen by comparing data in FIGS. 14 and 15 that the performance test results of the materials are closely related to the particle size of the materials. When sodium titanate is used in a sodium ion battery, the battery has the best discharge capacity at different charge/discharge rates when the particle size of sodium titanate having a hierarchical structure is 100-150 nm. When lithium titanate is used in a lithium ion battery, the battery has the best discharge capacity at different charge/discharge rates when the particle size of lithium titanate having a hierarchical structure is 60-80 nm.

In summary it can be seen that the process for preparing a titanic acid salt, titanic acid, and titanium oxide having a controllable particle size and a hierarchical structure provided by the present disclosure is the first to realize the particle size regulation of the material having a hierarchical structure. The process can also produce titanic acid salt microbeads with a hierarchical structure having a particle size of less than 100 nanometers, and obtain the morphology and structure when the material performance is the best.

It is to be understood that the above description is for the purpose of illustration and not limitation. Many embodiments and many applications other than the provided examples will be apparent to those skilled in the art by reading this description. Thus, the scope of the disclosure should not be determined by reference to the above description, but should be determined by the whole scope of the claims and equivalents to which these claims are entitled. The disclosures of all articles and references, including patent applications and publications, are hereby incorporated by reference in its entirety for all purposes. Any aspect of the subject matter disclosed herein, which is omitted in the claims, is not intended to be a disclaimer of the subject matter, and it should not be construed that the inventor does not consider such a subject matter as be a part of the disclosed inventive subject matters.

What is claimed is:

1. A process for preparing a titanic acid salt having a controllable particle size and a hierarchical structure, wherein the titanic acid salt is sodium titanate and the hierarchical structure is a spherical hierarchical structure composed of nanotube particles; wherein the process comprises the steps of:

S1, preparing a titanium-containing peroxo-complex solution;

S2, adding a basic metal compound to the titanium-containing peroxo-complex solution to form a mixture solution;

S3, adding a polymer to the mixture solution to form a precursor dispersion; the polymer includes one of polyvinyl alcohol, and hydroxypropyl methyl cellulose; and S4, subjecting the precursor dispersion to a solvothermal reaction to obtain the titanic acid salt having a hierarchical structure;

wherein the basic metal compound is sodium hydroxide;

wherein in S1, the process for preparing the titanium-containing peroxo-complex solution is carried out by dispersing a titanium source in an aqueous hydrogen peroxide solution to form a solution; the molar concentration ratio of the titanium source to the hydrogen peroxide is 1:3 to 1:6;

wherein in S1, the dispersing is carried out by one or more selected from dispersion under agitation and ultrasonic dispersion; and the dispersing is carried out at a temperature of from 10 degrees Celsius to 100 degrees Celsius; the aqueous hydrogen peroxide solution is an alkaline aqueous hydrogen peroxide solution; the alkaline aqueous hydrogen peroxide solution is adjusted to be alkaline with aqueous ammonia;

wherein a titanium source is selected from hydrated titanic acid; the hydrated titanic acid being obtained from a titanium-containing compound by a hydrolysis reaction;

wherein the titanium-containing compound is titanium oxysulfate;

wherein the hydrolysis reaction is carried out by dispersing the titanium-containing compound in an aqueous solution containing a basic substance for hydrolysis to form the hydrated titanic acid; the basic substance is aqueous ammonia;

wherein in S4, the solvothermal reaction is carried out at a temperature of 80 degrees Celsius to 200 degrees Celsius; the solvothermal reaction is carried out for 1 to 24 hours.

2. The process according to claim 1, wherein the titanium-containing compound is subjected to the hydrolysis reaction and then purified to obtain the hydrated titanic acid; wherein the purification is used to remove impurity ions to obtain the hydrated titanic acid having a purity of 97% or more; the purification is carried out by one or more of water washing—separation by centrifugation, water washing-membrane separation, water washing-filtration and dialysis.

3. The process according to claim 1, wherein in S2, the concentration of the basic metal compound in the mixture solution is 0.05 mol/L to 0.4 mol/L;

the molar ratio of the titanium source to the basic metal compound is 1:100 to 1:1; and the basic metal compound is added in the form of a solid or an aqueous solution.

4. The process according to claim 1, wherein in S3, the content by mass of the polymer in the precursor dispersion is 0.01% to 10%.

* * * * *